US012607907B2

(12) United States Patent
Kaluzinski et al.

(10) Patent No.: US 12,607,907 B2
(45) Date of Patent: Apr. 21, 2026

(54) CASING FOR A CAMERA ASSEMBLY AND CAMERA ASSEMBLY

(71) Applicant: Aptiv Technologies AG, Schaffhausen (CH)

(72) Inventors: Adam Kaluzinski, Cracow (PL); Mateusz Augustyn, Cracow (PL); Janusz Duralek, Skawina (PL); Przemyslaw Antos, Cracow (PL); Arkadiusz Kowalewski, Niepotomice (PL); Lukasz Dlugolecki, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 119 days.

(21) Appl. No.: 18/626,890

(22) Filed: Apr. 4, 2024

(65) Prior Publication Data

US 2025/0231465 A1     Jul. 17, 2025

(30) Foreign Application Priority Data

Jan. 11, 2024     (EP) ..................................... 24151410

(51) Int. Cl.
G03B 17/02          (2021.01)
B60R 11/04          (2006.01)
(52) U.S. Cl.
CPC .............. G03B 17/02 (2013.01); B60R 11/04 (2013.01)

(58) Field of Classification Search
CPC ........ G03B 17/02; G03B 15/05; G03B 17/08; G03B 30/00; B60R 11/04
See application file for complete search history.

(56) References Cited

U.S. PATENT DOCUMENTS

| | | | | |
|---|---|---|---|---|
| 4,871,917 A | * | 10/1989 | O'Farrell | G01N 21/43 |
| | | | | 250/341.7 |
| 2004/0032668 A1 | * | 2/2004 | Schaefer | B60R 11/04 |
| | | | | 359/642 |
| 2014/0340519 A1 | * | 11/2014 | Schofield | B60R 1/12 |
| | | | | 348/148 |
| 2015/0329063 A1 | * | 11/2015 | Lawlor | B60R 1/12 |
| | | | | 248/205.3 |
| 2017/0274836 A1 | * | 9/2017 | Kasai | H04N 23/51 |

FOREIGN PATENT DOCUMENTS

CN          203358477 U     * 12/2013

* cited by examiner

*Primary Examiner* — Christopher E Mahoney
(74) *Attorney, Agent, or Firm* — Harness, Dickey & Pierce, P.L.C.

(57)          ABSTRACT

The present disclosure relates to a casing for a camera assembly, the casing configured for a sealed arrangement at a transparent surface. Further, the present disclosure relates to a camera assembly comprising said casing and a camera.

12 Claims, 4 Drawing Sheets

CASING FOR A CAMERA ASSEMBLY AND CAMERA ASSEMBLY

CROSS-REFERENCE TO RELATED APPLICATIONS

Figure 1:
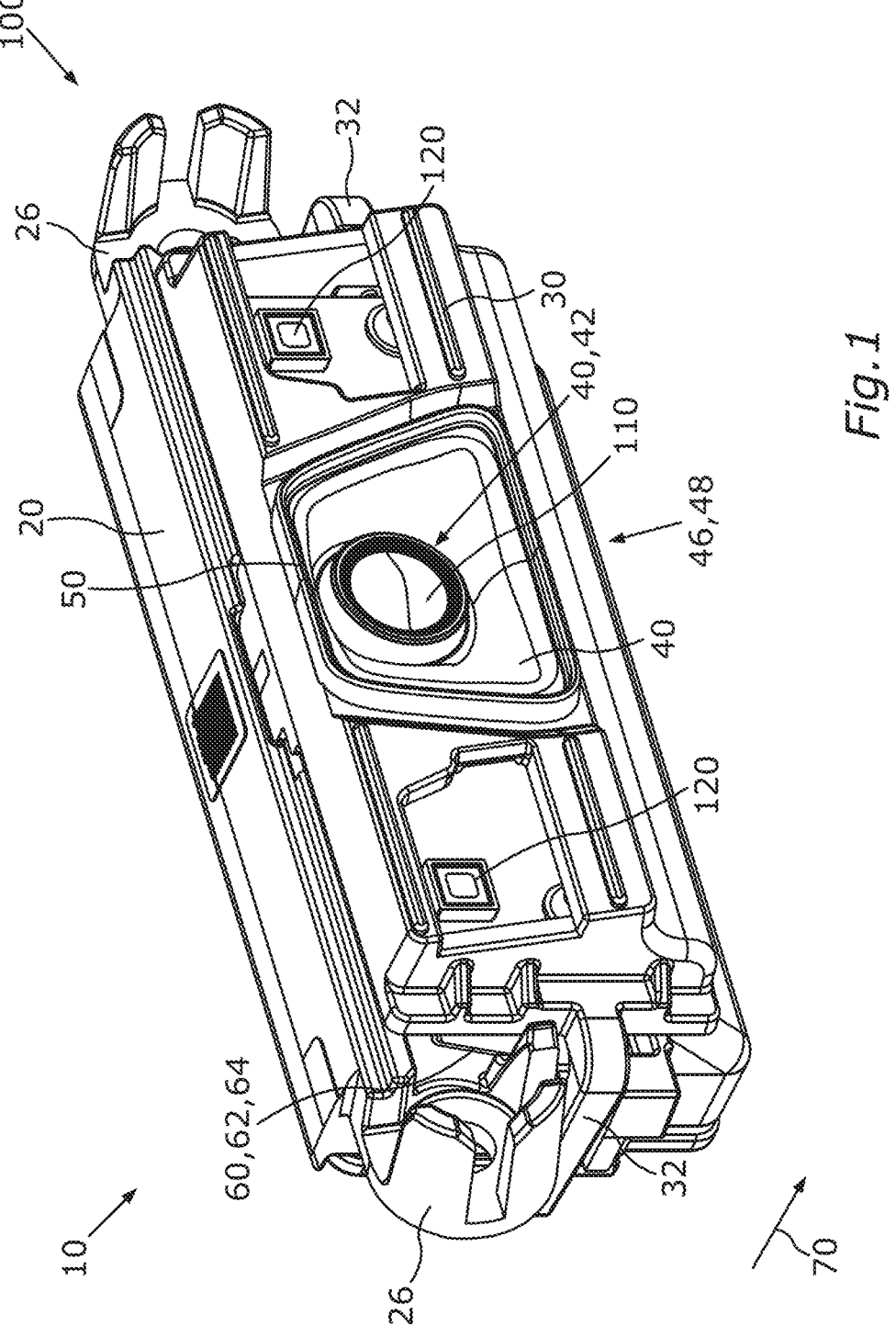

This application claims the benefit and priority of European patent application number 24151410.8, filed on Jan. 11, 2024. The entire disclosure of the above application is incorporated herein by reference.

FIELD

This section provides background information related to the present disclosure which is not necessarily prior art.

The present disclosure relates to a casing for a camera assembly, the casing configured for a sealed arrangement at a transparent surface. Further, the present disclosure relates to a camera assembly comprising said casing and a camera.

BACKGROUND

A usage of cameras in automotive applications is generally known. Fields of application of said cameras cover for instance driver monitoring, traffic sign recognition and parking assistance. In most of the cases, the respective camera is provided as separate entity, namely a camera assembly, whereby the camera assembly comprises a casing in which the camera is arranged.

It is further known to arrange said camera assembly, and hence the camera provided within the camera assembly, behind a transparent surface. The transparency of the surface still allows the camera to function, namely to take pictures or videos of the surroundings. Said arrangement of the camera behind a transparent surface separate to the camera assembly provides the advantage that on the one hand the camera is shielded against possible harmful contact to the environment, such as for instance dust ingression. On the other hand, it is possible to adapt the surface on the design of its intended installation location, in particular independent of the camera assembly. Thereby a sealing a contact area of camera assembly and the external surface is useful, in particular for providing a light-tight environment for the camera.

According to the state of the art, said sealing is provided by a gasket directly arranged on a camera housing of the camera assembly. For a compensation of tolerances, it is known to provide the gasket with an extended width.

However, this leads to a bulky gasket, which can cause several problems. First, such bulky gaskets might limit the field of view of the camera. Further, as for a bulky gasket more material is needed, a reaction of said bulky gasket on environmental conditions, in particular temperature changes, is enhanced. This can lead to both, to an increased pressure onto the transparent surface, or to a loss of contact of the gasket to the surface. The former might lead to failures of the surface, be it an actual defect or, for example, imaging errors or distortions if the transparent surface is also used to cover a screen unit. The latter leads to a loss of the actual sealing between the camera assembly and the external surface.

Accordingly, there is a need for casings and camera assemblies which provide an easy and reliable way to seal the casing with respect to an external surface, wherein negative effects on both, a field of view of the camera and the external surface, respectively, are minimized.

SUMMARY

This section provides a general summary of the disclosure, and is not a comprehensive disclosure of its full scope or all of its features.

The present disclosure provides a casing, and a camera assembly according to the independent claims. Embodiments are given in the subclaims, the description and the drawings.

In one aspect, the present disclosure is directed at a casing for a camera assembly, the casing configured for a sealed arrangement at a transparent surface, the casing comprising a camera housing and a gasket holder, wherein the gasket holder is slidably arranged on the camera housing and comprises an opaque funnel for defining a field of view for the camera, whereby the funnel continuously extends between an inner opening at an inner end of the funnel and an outer opening at an outer end of the funnel, wherein the camera housing comprises arrangement means for arranging the camera at and/or in the inner opening, wherein the gasket holder comprises an annular sealing member surrounding the outer opening for sealingly contacting the transparent surface, and wherein the casing comprises spring means arranged between the camera housing and the gasket holder for exerting a compression force onto the gasket holder towards the outer end of the funnel.

The casing essentially comprises two parts, namely a camera housing and a gasket holder. The camera housing and the gasket holder are slidably arranged on each other. In other words, the two parts can be moved with respect to each other, wherein nevertheless they are attached to each other.

The respective camera is arranged within the camera housing. For this, the camera housing comprises respective arrangement means, for instance mounting spaces for form-fittingly arranging the camera, screw holes, latches or similar elements.

The gasket holder comprises an opaque funnel. Opaque means that the funnel is lightproof at least for the range of wavelength at which the camera is sensitive. The funnel extends between an inner opening, located within the casing, and an outer opening, which opens to outside of the casing. As usual for a funnel, a cross section of the inner opening is smaller than a cross section of the outer opening. The shape of the cross sections of the two openings can be identical, identical except for scaling, or different.

Both openings are located at opposing ends of the funnel, namely an inner end, which is located within the casing and faces the camera housing, and an outer end, which forms an outer boundary of the casing itself. The two openings are connected by an inner surface of the funnel. The inner surface continuously extends from the inner opening at the inner end up to the outer opening at the outer end. The inner surface is made from an opaque material.

The arrangement means of the camera housing are constructed such that they can arrange and fix the camera within the casing at and/or in the inner opening of the funnel. Hence, a field of view of the camera is only limited by the inner surface of the funnel, as the outer opening opens to the outside of the casing. In other words, the field of view of the camera is defined by the funnel, namely the above-mentioned inner surface of the funnel.

In particular, said arrangement of the camera at and/or in the inner opening stays essentially unaffected when the camera housing and the gasket holder are slidably moved with respect to each other in the sense of that at least an objective lens of the camera stays within the funnel during said movement.

Additionally, the gasket holder comprises an annular sealing member. Said sealing member surrounds the outer opening and is intended for a contact to an external transparent surface. The sealing member is flexible and/or elastic, so that in a mounted state of the casing the external surface can be contacted sealingly, especially by slightly compressing the sealing member. In addition to a protection against possible harmful contact to the environment, for instance against the ingress of dust, also a light-proof connection between the casing and the external transparent surface can be provided. As the sealing member is annular and surrounds the outer opening, said protection can be provided over the whole circumference of the outer opening. The sealing member can for instance be an O-ring.

As described above, in the mounted state of the casing the sealing member preferably is slightly pressed against the external surface. This is provided by spring means of the casing which are arranged between the camera housing and the gasket holder. Said spring means exert a compression force which drives the camera housing and the gasket holder away from each other, as these two parts are slidably arranged on each other. Usually, in the mounted state the camera housing is fixed, and hence the gasket holder and thereby its sealing member is pressed against the external surface.

In summary, the casing comprises on the one hand sealing member, which is responsible only for sealing the funnel, and hence the casing, against an external surface, and on the other hand a spring means for exerting the force necessary for ensuring said sealing by pressing the sealing member against the external surface in the mounted state of the casing. By this separation of means, especially the sealing member can be downsized, reducing the amount of material needed. An obstruction of a field of view of the camera by protruding material of a gasket into said field of view, or a negative impact of expanding or shrinking gasket material on the external surface can thereby be avoided. A casing which provides an easy and reliable way to seal the casing with respect to an external surface can be provided.

According to an embodiment, the gasket holder is slidably arranged on the camera housing in a direction perpendicular to a plane defined by the annular sealing member. The sealing member is intended to seal against the external surface. Hence, the plane defined by the annular sealing member preferably corresponds to the external surface. By providing the direction of the sliding movement of the gasket holder with respect to the camera housing perpendicular to said plane defined by the sealing member, a food sealingly contact between the sealing member and the external surface can be provided independent of the actual relative position of the camera housing and the gasket holder.

According to an embodiment, the spring means comprises two spring elements, wherein the two spring elements are arranged at opposite sides of the funnel. By providing two spring elements, the compression force provided by the spring means can be exerted at two different positions and hence provided more evenly over the whole gasket holder. By providing the two spring elements at opposite sides of the funnel, a tilt of the gasket holder with respect to the camera housing can be avoided.

According to an enhanced embodiment, the two spring elements are z-like flat springs. Z-like flat springs are mechanically especially simple spring elements. In addition, they are cheap, for instance compared to coil springs.

According to an embodiment, the spring means is attached to the gasket holder. By arranging the spring means at the gasket holder, it can be ensured that the spring means are fixed at one specific part of the casing. Preferably, the respective spring element is attached at one of its ends at the gasket holder and form-fittingly contacts the camera housing in the direction of the sliding movement of the gasket holder with respect to the camera housing.

According to an enhanced embodiment, the gasket holder comprises one or more sliding legs and the camera housing comprises guiding means constructed for linearly guiding the one or more sliding legs. By this, the sliding movement of the gasket holder with respect to the camera housing can be provided as a linear sliding movement in a specific direction only. The sliding legs extend along said intended sliding direction. The guiding means contact said sliding legs and thereby prohibit a deviation from the linear sliding movement.

According to a further enhanced embodiment, each of the one or more sliding legs ends in a hook, wherein the respective hook form-fittingly contacts the camera housing, when the gasket holder is in a position maximally distanced to the camera housing. In other words, the gasket holder is arranged loss-proof at the camera housing. This can be especially useful for a transport or storing of a pre-mounted casing, as there is no external surface for limiting the sliding movement of the gasket holder with respect to the camera housing.

According to an embodiment, the camera housing comprises one or more mounting elements for arranging the casing to a device comprising the transparent surface. Said mounting elements can be for instance threaded or unthreaded screw holes, latching elements, pins or similar elements. As already mentioned above, in most of the cases the camera housing provides the mounting functionality for the whole casing. By providing arranging elements, said mounting functionality can be provided easily.

In another aspect, the present disclosure is directed at a camera assembly comprising a casing according to one of the embodiments described above and a camera, wherein the camera is arranged in the camera housing at and/or in the inner opening of the funnel.

The camera assembly comprises the casing in one of the embodiments as described above. All features and advantages described above with respect to the casing can therefore also be provided by the camera assembly with such a casing.

In particular, the camera assembly comprises a camera already arranged within the casing. Said camera can capture still images and/or videos of the environment. The camera is arranged by the arrangement means of the camera housing at and/or in the inner opening of the funnel. Thereby the camera fills the inner opening and the inner surface of the funnel limits and hence defines the field of view of the camera.

According to an embodiment, a control and/or a readout electronics of the camera is likewise arranged within the camera housing. Thereby all necessary electronics to control and/or readout the camera are already available in the camera assembly itself. Only a power supply and a data connection have to be provided, whereby also the power supply can be provided as internal power source such as for instance a battery or an accumulator. A camera assembly independent of external control and/or readout can thereby be provided.

According to an embodiment, the camera is sensitive for visible light and/or infrared light. A camera sensitive for visible light is especially useful for applications in which the captured images and/or videos are presented to the user, for instance for providing a live video for parking assistance. Infrared light cameras can be used for surveillance, both of the environment and of the user or driver, respectively. In particular, when using a camera sensitive for infrared light the scenery captured by the camera can be illuminated likewise with infrared light without disturbing the user, whose eye is not sensitive for infrared light.

According to an embodiment, one or more light sources are arranged in the camera housing and/or the gasket holder. Said one or more light sources can be used for illuminating the environment of the camera assembly. Thereby capturing images and/or videos by the camera can be provided independently from lighting conditions originally present.

According to an enhanced embodiment, two light sources are arranged at opposite sides of the funnel. As described above, the funnel limits and defines the field of view of the camera. By providing two light sources, the illumination of the environment can be provided more evenly. By providing the two light sources at opposite sides of the funnel, an illumination of a region of the environment directly in front of the funnel, and hence in the center of the field of view of the camera, can be enhanced further.

According to an alternative or additional embodiment, the one or more light sources are infrared light sources. As already mentioned above, the eye of a user is not sensitive for infrared light. Hence, by using infrared light sources an illumination of the environment to be captured by the camera can be provided without risking to blind the user. This is especially important for automotive applications, as blinding a driver of a car is especially dangerous.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings.

FIG. 1 schematically shows an illustration of a camera assembly in a perspective frontside view.

Figure 2:
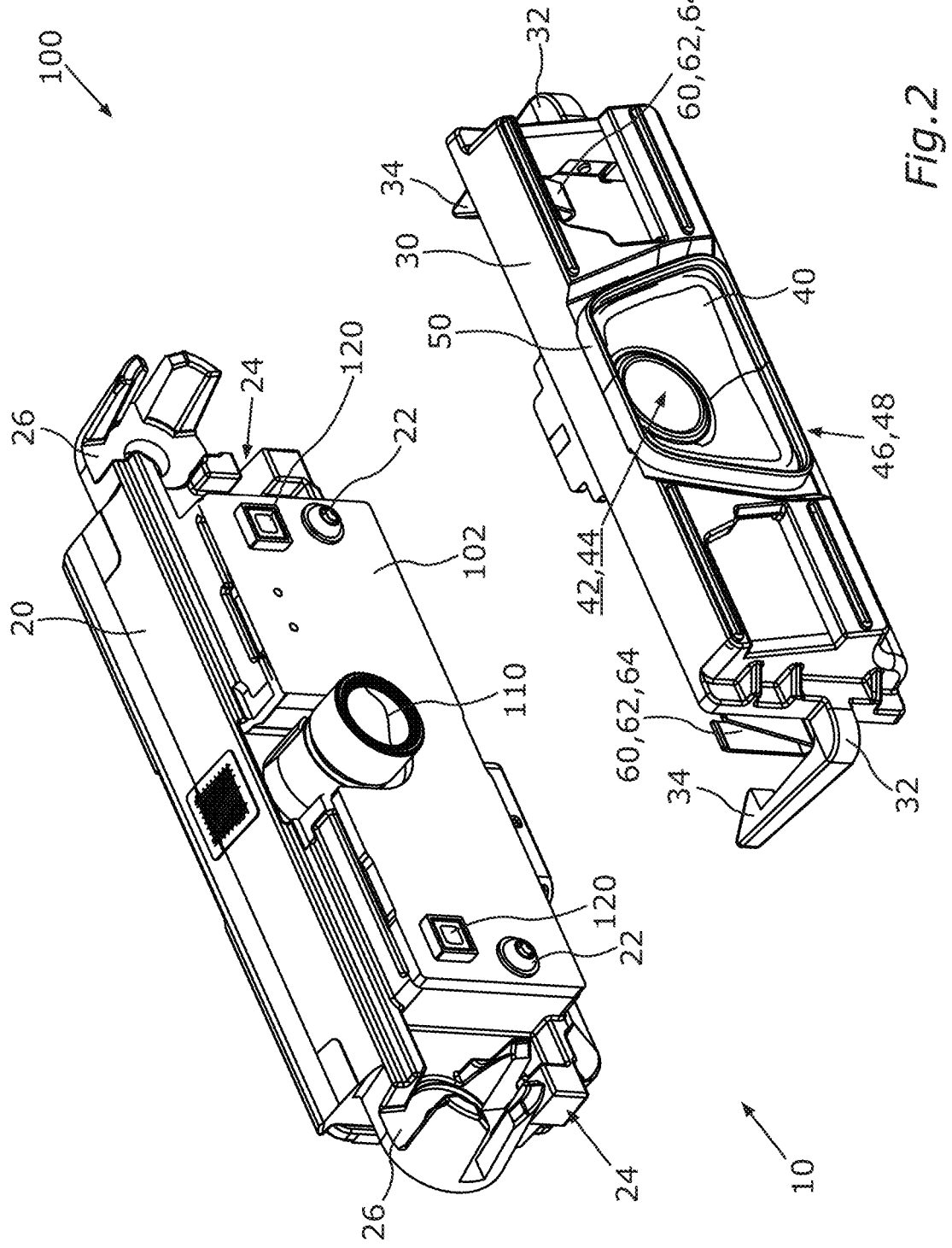

FIG. 2 schematically shows an illustration of the camera assembly of FIG. 1 separated into camera housing and gasket holder in a frontside view.

Figure 3:
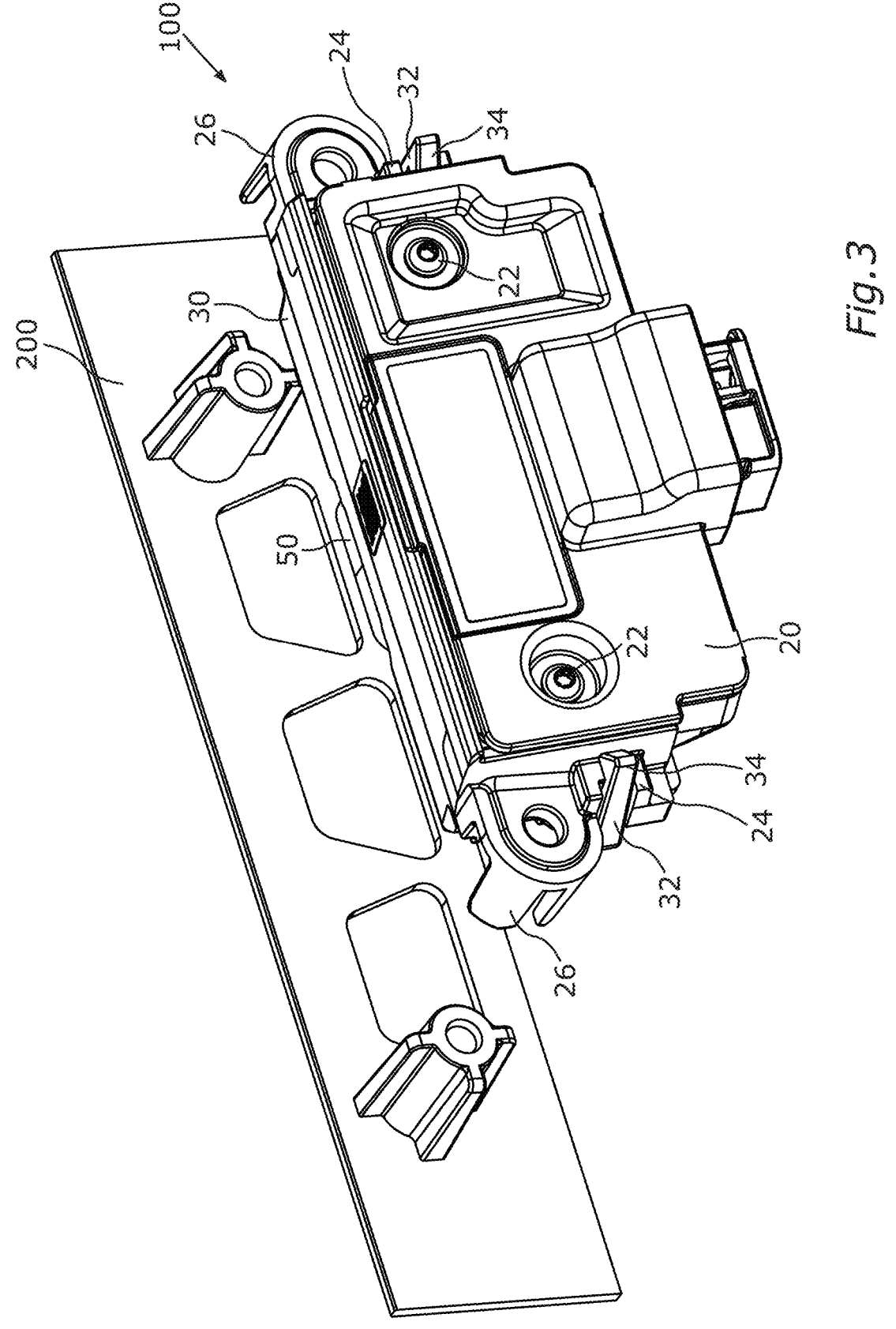

FIG. 3 schematically shows an illustration of the camera assembly of FIG. 1 in a backside view before mounting to an external transparent surface.

Figure 4:
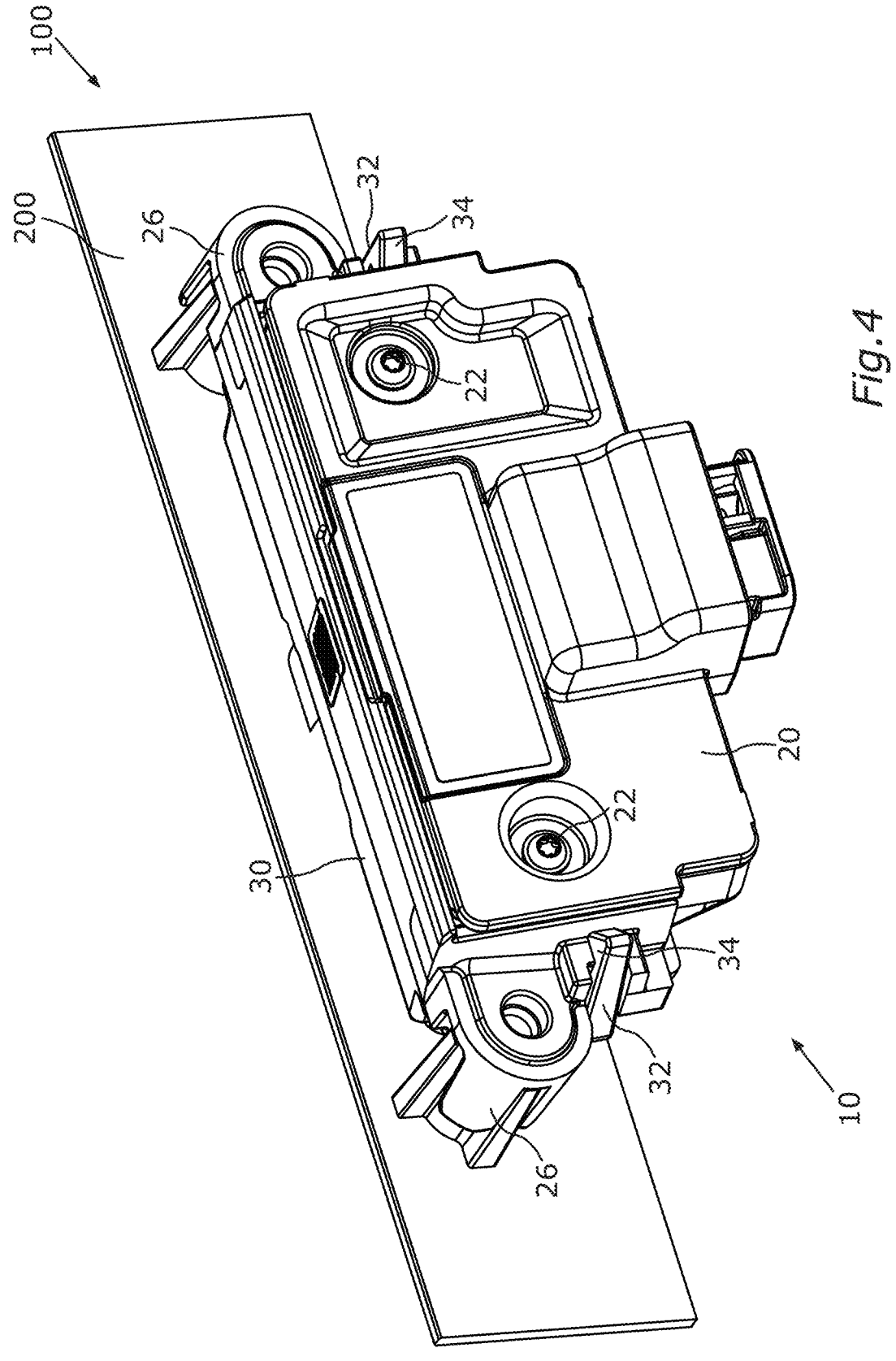

FIG. 4 schematically shows an illustration of the camera assembly of FIG. 1 in a backside view mounted to an external transparent surface.

Corresponding reference numerals indicate corresponding parts throughout the several views of the drawings.

DETAILED DESCRIPTION

Example embodiments will now be described more fully with reference to the accompanying drawings.

FIGS. 1 to 4 depict a possible embodiment of a camera assembly 100 comprising a casing 10 and a camera 110. In FIG. 1, 2, the camera assembly 100 is shown in a perspective frontside view, in FIG. 1 fully assembled and in FIG. 2 separated into camera housing 20 and gasket holder 30. FIG. 3, 4 show backside views of the camera assembly 100 and an external transparent surface 200, in FIG. 3 before mounting, in FIG. 4 after mounting the camera assembly 100 on the surface 200.

The camera assembly 100 shown in FIGS. 1 to 4 is described below, with reference being made to the specific features visible in the respective figures.

The casing 10 of the camera assembly 100 essentially comprises two main parts, namely a camera housing 20 and a gasket holder 30. As depicted, in particular the camera housing 20 can be built up from several elements.

The camera housing 20 comprises arrangement means 22 for an arrangement of the actual camera 110. Further, also a control and/or readout electronics 102 of the camera assembly 100 can be arranged within the camera housing 20. In the depicted embodiment, the camera 110 is arranged together with the control and/or readout electronics 102 on an additional circuit board, which is arranged and fixed within the camera housing 20 by the arrangement means 22, see especially FIG. 2.

The gasket holder 30 forms the frontal end of the casing 10. In particular, the gasket holder 30 is slidably arranged at the camera housing 20. For this, the camera housing 20 comprises guiding means 24 and the gasket holder 30 comprises sliding legs 32, see especially FIG. 2, 3. The sliding legs 32 engage the guiding means 24 and thereby allowing a linear sliding movement of the gasket holder 30 with respect to the camera housing 20. Hooks 34 at respective ends of the sliding legs 32 limit said sliding movement, in particular to provide a loss-proof arrangement of the gasket holder 30 on the camera housing 20.

The gasket holder 30 comprises as central part a funnel 40, which continuously extends between an inner opening 44 at an inner end 42 facing the camera housing 20 and an outer opening 48 at an outer end 46 open to the environment, see in particular FIG. 2. The camera housing 20 and the gasket holder 30 are constructed with respect to each other such that the camera 110 in its mounted state is arranged at and/or in the inner opening 44 of the funnel 40, see especially FIG. 1. In other words, the funnel 40 limits and defines the field of view of the camera 110.

The camera assembly 100 is in particular intended to be used and to be arranged on an external transparent surface 200, for instance in an automotive environment. The external surface 200 is shown in FIG. 3, 4. As depicted, the external surface 200, which is a part separate to the camera assembly 100 according to the present invention, can comprise one or more windows explicitly transparent for wavelength for which the camera 110 is sensible and/or for a wavelength of the respective light sources 120. Thereby, the camera 110, and if applicable also the light sources 120, can for instance be shielded against environmental harm, and simultaneously the camera assembly 100 can be constructed independently from an interior design, which is taken care of by the external surface 200. For the arrangement, the camera housing 20 preferably comprises mounting elements 26 for arranging the casing 10, and hence the camera assembly 100, directly to the transparent surface 200 and/or to a device comprising the transparent surface 200.

For said sealing the camera assembly 100 against the environment, a sealing member 50 is arranged at the outer end 46 of the funnel 40 and surrounds the outer opening 48, see FIG. 1, 2, 3. In particular, said sealing member 50 can be provided made from an elastic material and hence forms a gasket against the external surface 200.

However, as the gasket holder 30 is slidably arranged at the camera housing 20, for a reliable sealing it has to be ensured that the sealing member 50 is pressed against the external surface 200 (see FIG. 4). For this purpose, the casing 10 comprises a spring means 60 arranged between the camera housing 20 and the gasket holder 30 for exerting a compression force 70 (see FIG. 1) onto the gasket holder 30 towards its outer end 46. As depicted especially in FIG. 2, two spring elements 62 provided as z-shaped flat springs 64 are arranged at the gasket holder 30 on opposite sides of the funnel 40. By that, said compression force 70 can be provided more evenly distributed.

The spring means 60 drives the gasket holder 30 away from the camera housing 20. As the camera housing 20 is fixed to the external transparent surface 200 via the mounting elements 26 (see FIG. 4), the gasket holder 30, and hence the sealing member 50, is pressed against the external surface 200. A reliable sealing and also a compensation of manufacturing tolerances can thereby be provided.

In this context it is to be noted that the sliding movement of the gasket holder 30 with respect to the camera housing 20 is provided preferably such that it is perpendicular to a plane defined by the sealing member 50, and thereby perpendicular to the external surface 200. This can for instance be achieved by accordingly constructed guiding means 24 and sliding legs 32, respectively.

Further to the camera 110, also two light sources 120 are part of the depicted embodiment of the camera assembly 100. The depicted arrangement of the light sources 120 at opposite sides of the funnel 40 leads to an especially bright and even illumination of the region of the environment captured by the camera 110. Preferably, the light sources 120 can be infrared light sources 120. In this case, also the camera 110 is preferably sensitive for infrared light. However, also cameras 110 sensible in the visual light regime or even in both, infrared and visual light regime, are suitable in camera assemblies 100.

REFERENCE NUMERAL LIST 10 casing
20 camera housing
22 arrangement means
24 guiding means
26 mounting element
30 gasket holder
32 sliding leg
34 hook
40 funnel
42 inner end
44 inner opening
46 outer end
48 outer opening
50 sealing member
60 spring means
62 spring element
64 flat spring
70 compression force
100 camera assembly
102 electronics
110 camera
120 light source
200 transparent surface

8

What is claimed is:

1. A casing for a camera assembly, the casing configured for a sealed arrangement at a transparent surface, the casing comprising a camera housing and a gasket holder, wherein the gasket holder is slidably arranged on the camera housing and comprises an opaque funnel for defining a field of view for a camera, whereby the funnel continuously extends between an inner opening at an inner end of the funnel and an outer opening at an outer end of the funnel, wherein the camera housing comprises arrangement means for arranging the camera at and/or in the inner opening, wherein the gasket holder comprises an annular sealing member surrounding the outer opening for sealingly contacting the transparent surface, wherein the casing comprises spring means arranged between the camera housing and the gasket holder for exerting a compression force onto the gasket holder towards the outer end of the funnel, wherein the gasket holder comprises one or more sliding legs and the camera housing comprises guiding means constructed for linearly guiding the one or more sliding legs, and wherein each of the one or more sliding legs ends in a hook and the respective one or more hooks form-fittingly contact the camera housing for defining a position of the gasket holder maximally distanced to the camera housing.

2. The casing according to claim 1,
wherein the gasket holder is slidably arranged on the camera housing in a direction perpendicular to a plane defined by the annular sealing member.

3. The casing according to claim 1,
wherein the spring means comprises two spring elements, wherein the two spring elements are arranged at opposite sides of the funnel.

4. The casing according to claim 3,
wherein the two spring elements are z-like flat springs.

5. The casing according to claim 1,
wherein the spring means is attached to the gasket holder.

6. The casing according to claim 1,
wherein the camera housing comprises one or more mounting elements for arranging the casing to a device comprising the transparent surface.

7. An assembly comprising the casing according to claim 1 and the camera, wherein the camera is arranged in the camera housing at and/or in the inner opening of the funnel.

8. The assembly according to claim 7,
wherein a control and/or a readout electronics of the camera is likewise arranged within the camera housing.

9. The assembly according to claim 7,
wherein the camera is sensitive for visible light and/or infrared light.

10. The assembly according to claim 7,
wherein one or more light sources are arranged in the camera housing and/or the gasket holder.

11. The assembly according to claim 10,
wherein two light sources are arranged at opposite sides of the funnel.

12. The assembly according to claim 10,
wherein the one or more light sources are infrared light sources.

* * * * *